(12) United States Patent
Nittynen

(10) Patent No.: US 7,770,127 B2
(45) Date of Patent: Aug. 3, 2010

(54) METHOD FOR PROCESSING OF INFORMATION AND A TERMINAL

(75) Inventor: Anu Nittynen, Tampere (FI)

(73) Assignee: Nokia Corporation, Espoo (FI)

( * ) Notice: Subject to any disclaimer, the term of this patent is extended or adjusted under 35 U.S.C. 154(b) by 928 days.

(21) Appl. No.: 10/295,321

(22) Filed: Nov. 15, 2002

(65) Prior Publication Data

US 2003/0090520 A1 May 15, 2003

(30) Foreign Application Priority Data

Nov. 15, 2001 (FI) .................................. 20012220

(51) Int. Cl.
*G06F 3/048* (2006.01)
(52) U.S. Cl. .................. 715/770; 715/764; 715/864
(58) Field of Classification Search ............... 715/764
See application file for complete search history.

(56) References Cited

U.S. PATENT DOCUMENTS

| | | | | |
|---|---|---|---|---|
| 5,404,439 A | * | 4/1995 | Moran et al. | ................. 715/814 |
| 5,442,742 A | | 8/1995 | Greyson et al. | |
| 5,726,688 A | * | 3/1998 | Siefert et al. | ................. 715/821 |
| 5,867,144 A | | 2/1999 | Wyard | |
| 6,331,840 B1 | * | 12/2001 | Nielson et al. | ................. 345/1.1 |
| 6,373,947 B1 | * | 4/2002 | Pomerantz et al. | ........... 380/212 |
| 6,392,640 B1 | * | 5/2002 | Will | ................. 345/184 |
| 2002/0080186 A1 | * | 6/2002 | Frederiksen | ................. 345/808 |
| 2003/0151624 A1 | * | 8/2003 | Hammond | ................. 345/764 |
| 2003/0210280 A1 | * | 11/2003 | Baker et al. | ................. 345/835 |
| 2004/0210842 A1 | * | 10/2004 | Qamar | ................. 715/538 |

FOREIGN PATENT DOCUMENTS

EP            946028 A2 *  9/1999

* cited by examiner

*Primary Examiner*—Boris Pesin
(74) *Attorney, Agent, or Firm*—Ware, Fressola, Van Der Sluys & Adolphson LLP

(57) ABSTRACT

The invention relates to a method for processing information in a terminal that comprises means for selecting the data group to be processed, and at least one processing means for processing the selected data group. In the method at least a first processing state and a second processing state are determined, as well as a group of functions for said processing means of the data group. In the method the processing state used at a given time is recognized, and a function corresponding to the processing state is set in said at least one processing means of the data group. The invention also relates to a terminal and a wireless communication device applying the method.

11 Claims, 3 Drawing Sheets

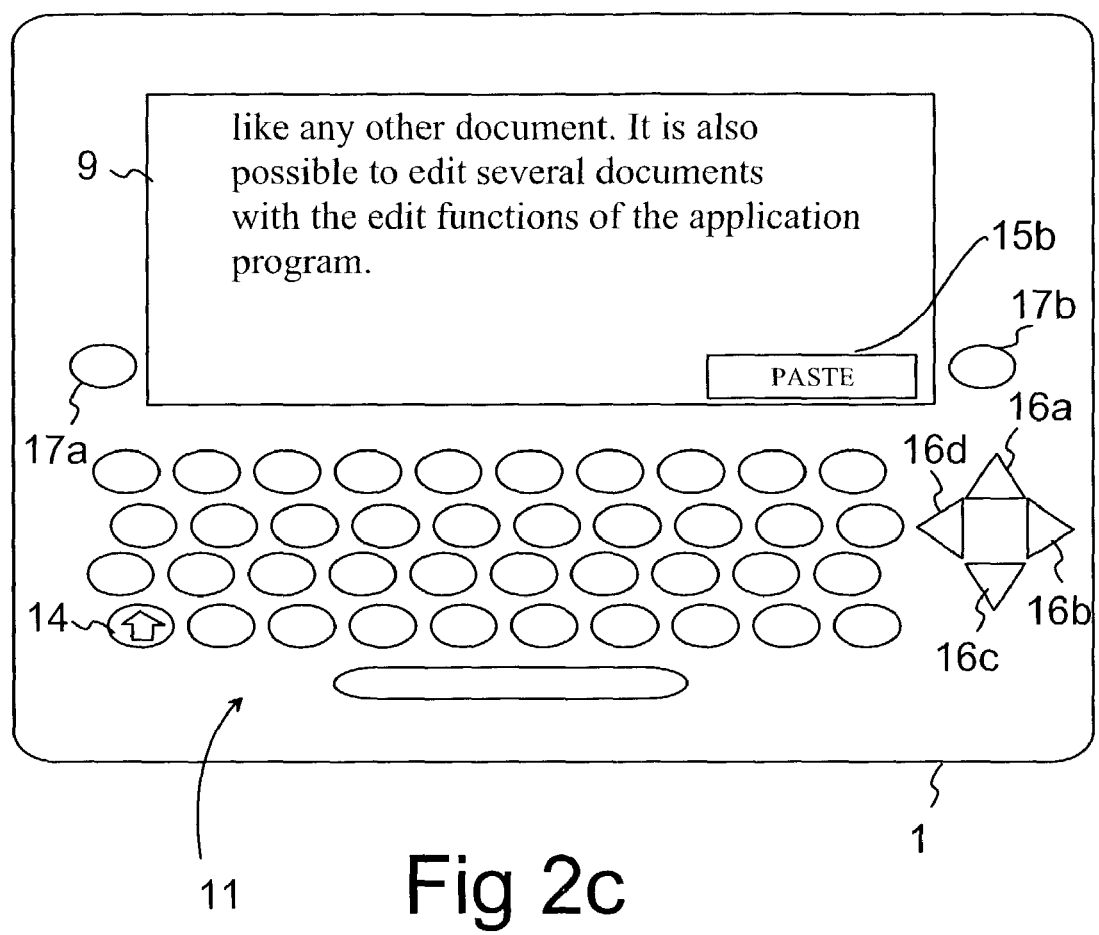

METHOD FOR PROCESSING OF INFORMATION AND A TERMINAL

CROSS REFERENCE TO RELATED APPLICATIONS

This application claims priority under 35 USC §119 to Finnish Patent Application No. 20012220 filed on Nov. 15, 2001.

FIELD OF THE INVENTION

The present invention relates to a method for processing of information in a terminal that comprises means for selecting a data group to be processed, and at least one processing means for processing the selected data group. In the method at least a first processing state and a second processing state are determined, as well as a group of functions for said processing means of the data group. The invention also relates to a terminal containing means for selecting a data group to be processed, and at least one processing means for processing the selected data group. In the terminal at least a first processing state and a second processing state are determined, as well as a group of functions for said processing means of the data group.

BACKGROUND OF THE INVENTION

There are terminals of prior art in which it is possible to process different kinds of information, such as text, images, etc. For example in computers it is possible to utilize application programs for example for writing documents and drawing pictures. In the data processing stage it is possible to utilize the copying properties by means of which it is possible to transfer information that has already been formed, such as parts of a text or an image, to another location in the file to be edited. Thus, it is possible to use the keys, a pointer device (mouse) or the like to select the section to be copied (highlight the area to be copied), whereafter the selected section is copied to a memory area (clipboard) arranged advantageously for this purpose. The information copied on the clipboard can thereafter be pasted to a desired location in the file according to the wishes of the user. This pasting point can also be indicated with the keys, a pointer device, or the like. When the desired location has been pointed out, the pasting of the information is advantageously conducted by means of a key or by indicating with the pointer device, wherein the information copied on the clipboard is copied to the indicated location. The above-mentioned principles can also be applied for transfer of the selected information to another location. When compared to copying, the difference lies in that the selected information is deleted from the original location.

In some terminals or operating systems used therein, the copying and transfer can only be conducted with set key combinations. For example in the generally known Windows® operating system the information can be selected by means of the keyboard in such a manner that the pointer (cursor) is transferred to the beginning or end of the data to be processed (copied/transferred) by using the arrow keys. Thereafter the area to be copied is selected in such a manner that the so-called SHIFT-key on the keyboard is pressed down and the cursor is transferred to the other terminal point (end or beginning) of the area to be processed. The selected area is typically indicated with a colour change, for example in such a manner that the normally dark text on a light background is changed into a light text on a dark background. This way the user can be sure that the selection has been made accurately. After the area to be processed is selected, for example the key combination CTRL+C (Control-key and the key for the letter C pressed down simultaneously) copies the information on the clipboard. Further, by using the arrow keys the cursor is transferred to the desired location, whereafter the information copied on the clipboard can be copied in this location with the key combination CTRL+V. The above-described function requires that the key combinations are memorized or written down somewhere near the terminal. Furthermore, the act of pressing such key combinations may in some cases be difficult.

In some terminals, the above-mentioned functions can also be conducted by means of a pointer device. Thus, by means of the pointer device the cursor is transferred to the beginning or end of the information to be processed. Thereafter a set key in the pointer device is pressed down and the cursor is transferred to the other terminal end of the area to be processed. During the transfer, said key must be pressed down. The copying to the clipboard can be conducted either with the above-mentioned key combination or by means of a pointer device by making a selection from a menu or the like. In some cases this menu can be brought forth by means of the other key of the pointer device. To paste the copied piece of information, the cursor is transferred to the desired location and by means of said key combination or by making a selection from a menu, the information can be copied from the clipboard to the location indicated by the cursor. The use of menus is often rather slow, and in addition, the user can easily select the wrong section from the menu. In such a case the user can accidentally even delete the text he/she has selected. To cancel an erroneous selection, the user can select the undo function or the like from the menu and conduct a new selection thereafter.

Patent application EP 0 946 028 discloses a copy and paste method for text that is implemented in a mobile station environment. In the method, a pop-up menu is opened when the text is selected and a set key is pressed. From this menu the user can select the correct function, for example the copying of the selected text on the clipboard. This arrangement also contains for example the drawback that the user can accidentally select the wrong function from the pop-up menu.

SUMMARY OF THE INVENTION

It is an aim of the present invention to provide an improved method for processing of information as well as a terminal in which the method is applied. The invention is based on the idea that during the processing of information, the terminal recognizes the processing state and on the basis of this processing state the operating states corresponding to this processing state are set in the data processing means. To be more exact, the method according to the present invention is primarily characterized in that the processing state used at a given time is recognized and that a function corresponding to the processing state is set in said at least one processing means of the data group. The terminal according to the invention is primarily characterized in that the terminal comprises means for recognizing the processing state used at a given time and means for setting a function corresponding to the processing state in said at least one processing means of the data group.

The present invention provides considerable advantages when compared to solutions of prior art. By means of the method according to the invention it is possible to facilitate processing of information for example due to the fact that the processing state used at a given time is taken into account in the functions of the selection keys or other corresponding data processing means. Thus, the possibility of erroneous selections is reduced, and it is not necessary for the user to memorize the key combinations set for different functions. This also facilitates the processing of data.

BRIEF DESCRIPTION OF THE DRAWINGS

In the following, the present invention will be described in more detail with reference to the appended drawings, in which FIGS. 2a, 2b and 2c show examples of different data processing situations in a terminal applying the method according to a preferred embodiment of the invention.

DETAILED DESCRIPTION OF THE INVENTION

Figure 1:
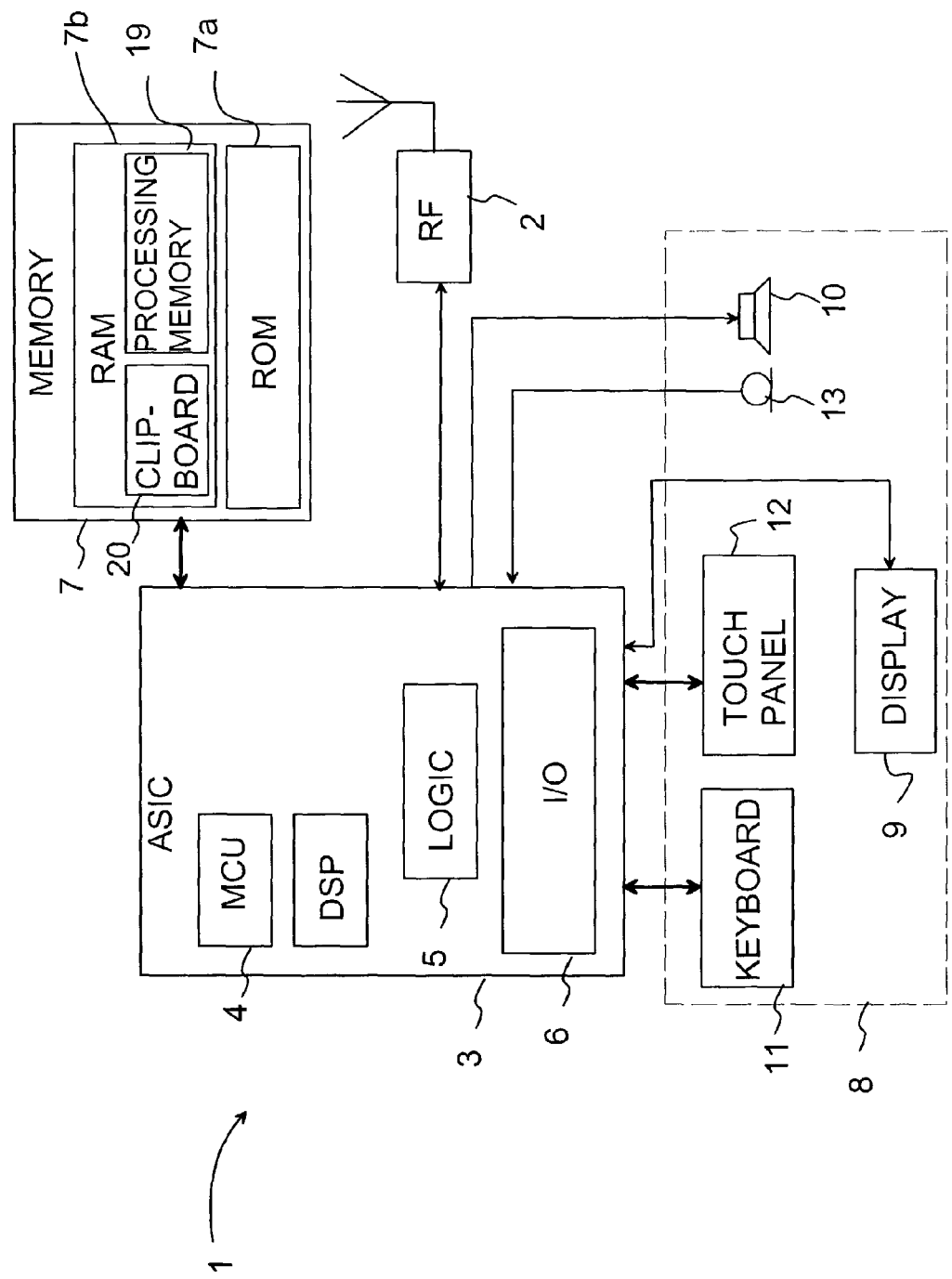
FIG. 1 shows a terminal according to a preferred embodiment of the invention in a reduced block chart.

FIG. 1 shows a terminal 1 according to a preferred embodiment of the invention in a reduced block chart. The terminal 1 used can be an electronic device equipped with data processing functions, such as a personal computer (PC), a laptop PC, a palmtop PC, a personal digital assistant (PDA), a wireless station, such as a mobile station or a communication device, or the like. In the following, more detailed description of the invention, a non-restrictive example used for the terminal 1 is a communication device which comprises not only data processing functions but also mobile station functions 2.

To control the function of the terminal 1, it also comprises a control block 3 with at least one processor 4, such as a microcontroller unit (MCU), and possibly also a digital signal processing unit (DSP). The control block also comprises logic functions 5 as well as access logic 6 (Input/Output, 10), e.g. for communication between other functional units and the processor 4. Furthermore, the terminal 1 comprises a memory 7, which preferably contains at least a read only memory (ROM) 7a and a random access memory (RAM) 7b. The read only memory 7a can also be implemented by means of a non-volatile random-access memory, such as EEPROM or FLASH. The read only memory 7a is intended for the storage of e.g. control software, application software, permanent data and the like in the terminal. The random access memory 7b can be used, for example, for the storage of changeable information required during the use of the terminal 1. It is obvious that a part of the random access memory 7b can be implemented by using a non-volatile random access memory, wherein it is possible to store in this memory, for example, information which does not need to be changed often, e.g. user profile data, telephone directory data, calendar data, etc. The user interface 8 of the terminal 1 comprises means for presenting data, such as a display 9 and an earpiece/speaker 10, as well as means for entering data, such as one or more keyboards 11, a touch panel 12 and a microphone 13. Mobile station functions 2 comprise, for example, a transmitter and a receiver (not shown), by means of which the terminal 1 can communicate with the mobile communication network in a way known as such. However, it should be mentioned that the present invention can also be applied in such terminals which do not comprise mobile station functions or other communication functions.

In this terminal 1 according to a preferred embodiment of the invention, a so-called touch panel display has also been implemented. Thus, in connection with the display 9, for example on top of the same, a touch sensitive member, i.e. a touch panel 12 has been placed that detects a pressing performed by the user. Thus, on the display 9 it is possible to present changing information, function keys or other corresponding elements suitable for different situations. The touch sensitive member 12 transmits the co-ordinate information corresponding to the contact point to the processor 4, which, on the basis of this co-ordinate information determines which function has been set in the contact point and performs the necessary actions. The function of a touch panel display is prior art known per se, wherein its description in more detail will not be necessary in this context.

Figure 2A:
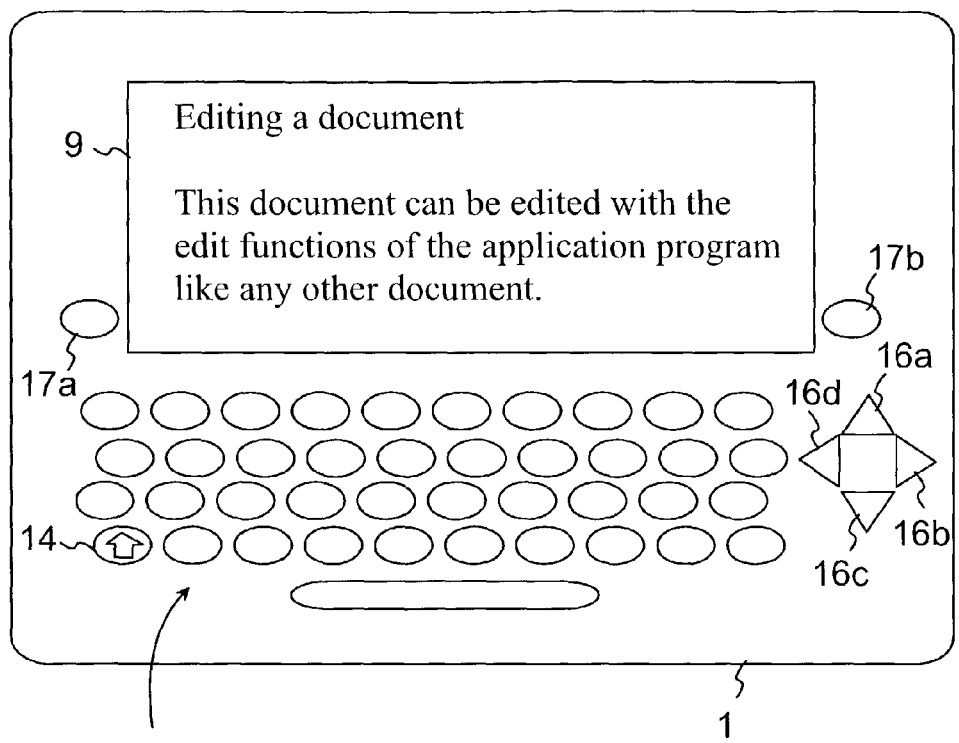
Figure 2B:
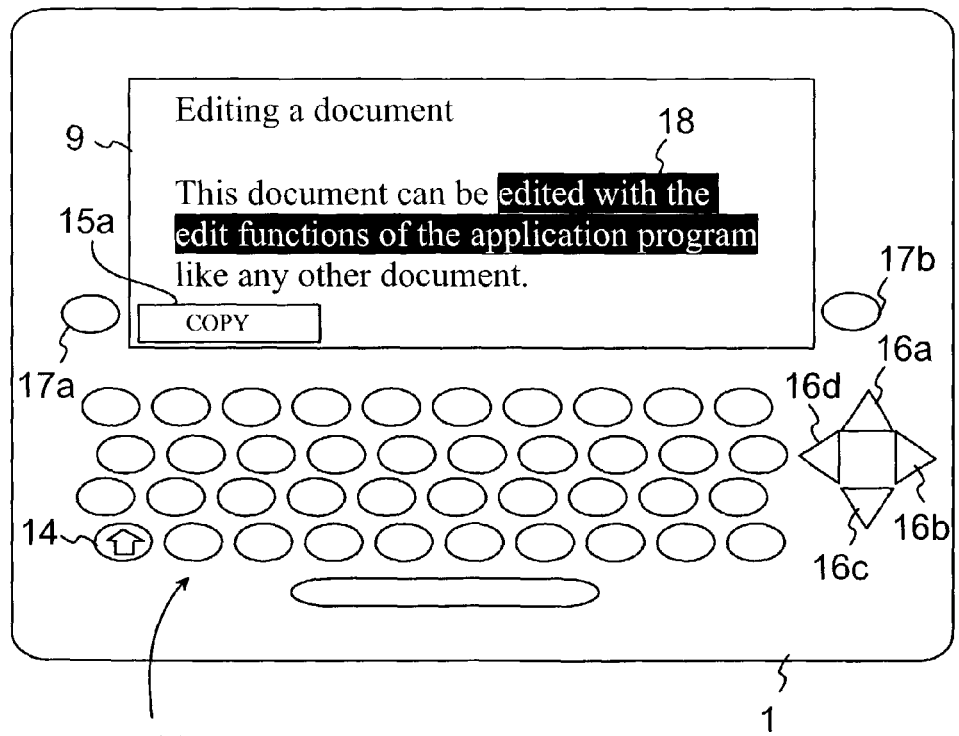

In the following, the operation of a method according to a preferred embodiment of the invention in the terminal of FIG. 1 will be described with reference to the example situations shown in FIGS. 2a to 2c. Let us assume, that at least one data processing application, such as a word processing program, a drawing program, a spreadsheet program or the like has been installed in the terminal 1. Let us also assume that the user activates a word processing program and starts processing the text. The user can for example start writing a new document or edit an existing document. The document consists of a group of data, such as letters, numbers, charts, etc. It is possible to give a name for the document on the basis of which the document can be found later as well. The term file is also used for such a data group, which is known as such. If an existing document is edited, the user opens this document by means of the word processing program, said document being advantageously stored in the random access memory 7b of the terminal 1. It is obvious that the document to be edited can also be retrieved with mobile station means from another data processing device in a manner known as such. In view of applying the present invention, it is not significant from where the document to be processed is retrieved. The processing of the document is advantageously conducted in the random access memory, and for this purpose, the processor typically allocates a memory area for the application in the random access memory 7b. This memory area, i.e. so-called processing memory is illustrated with the reference number 19 in FIG. 1.

FIG. 2 shows an example situation in which the user has opened a document, wherein the beginning of the same is presented on the display 9. In the keyboard, a selection key 14, such as a shift key has been determined. When this selection key 14 is pressed down, at least a first function key 15a appears on the display, if data to be copied/cut has been selected when pressing the selection key 14, and/or a second function key 15b, if there is information to be pasted stored on the clipboard. In connection with a touch panel display, such function keys 15a and 15b, can be implemented in such a way that information, such as a frame or a guiding text, indicating the function key is formed in a set location on the display 9. By means of these function keys 15a and 15b, it is possible to select, copy and/or paste information, as will be described hereinbelow. In such a situation where said selection key is not pressed down, it is possible to determine another function for the function keys 15a and 15b, wherein information corresponding to the function will be presented on the display 9 or this location on the display can be used for presenting other information.

When the user has opened the document to be processed, no information in the document has normally been selected. Thus, for example the selection key 14 is in this preferred embodiment set as a key determining the beginning and end of the information. By means of arrow keys 16a to 16d, a pointer device (not shown), or the like, it is possible to move the cursor to the desired location in the document. Thereafter one end point in the area to be processed is marked with the selection key 14 or with another key arranged for this purpose, for example with a key of the pointer device. When one terminal point (e.g. the beginning) of the area to be processed is marked, the pointer is transferred to the other terminal point (e.g. the end), the selection key 14 is held down, and the other terminal point is advantageously marked by releasing the selection key 14. At this stage the manner of representation of the selected data group 18 can be changed for example into a reversed one. In FIG. 2b the selected data group 18 is presented in light characters on a dark background, whereas the rest of the text is presented in dark characters on a light background. It is obvious that this is only a non-restrictive example for representing the selected data group 18.

Already when the selection is made, it is possible to set copying and/or cutting as the operating mode/s of the first function key 15a. This can be advantageously conducted at that stage when the selection of the data group is made and at least one piece of information (for example one character in the text) has been selected. This first function key and/or the guiding text corresponding to the operating mode of the same is/are also presented on the display 9 in this context. Thus, the selection key 14 does not have to be released after one terminal point has been marked, but it is possible to shift directly to copying/cutting.

Copying of information can be advantageously conducted in such a manner that the user holds the selection key down 14 after he/she has selected the data group, or if the key is not pressed down, the user presses the selection key 14 down. Thus, the operating mode of the first function key 15a is copying and/or cutting, and the corresponding guiding text is presented on the display 9. This means that when the user presses the first function key 15a, the selected data group is copied on the clipboard formed in the random access memory 7b, i.e. to a memory area intended for temporary storage of data. This clipboard is illustrated with the reference numeral 20 in FIG. 1. If the function is the cutting of data, the selected data group is removed from the original location at the same time.

Thus, at this stage the clipboard contains information, wherein when the selection key 14 is pressed down, pasting is set as the operating mode for the second function key 15b and a guiding text corresponding to the function of the second function key 15b is presented on the display 9. This situation is shown in the appended FIG. 2c.

The pasting of the data group copied on the clipboard is advantageously conducted in the following way. The user moves the cursor to the point in the document in which he/she wishes to paste the information contained in the clipboard. After the cursor has been moved, the user presses the selection key 14 down, wherein pasting is set as the state of the second function key. By holding the selection key 14 down and pressing the second function key 15b, the data group located on the clipboard is pasted in the location starting from the point indicated by the cursor. The pasting is conducted in such a manner that the processor 4 reads the information stored on the clipboard and copies it to the location in the random access memory in which the point of the document indicated by the cursor is situated. Thereafter the pasted data group is presented on the display 9, or part of the data group if there is not enough space for presenting the entire data group at once on the display 9. This is illustrated in FIG. 2c. When the selection key 14 is released, the operating modes of the first 15a and the second 15b function key are changed, if necessary. After the data group has been pasted, it is possible to either keep the pasted data group on the clipboard or empty the clipboard. If the clipboard is not emptied in connection with pasting, it is possible to paste the same data group in more than one location.

Copying can also be conducted in such a situation in which the clipboard contains information stored thereon already at an earlier stage. Thus, when the user has selected the data group to be copied and pressed the selection key 14 down, copying is set as the operating mode of the first function key 15a and pasting as the operating mode of the second function key. Corresponding guiding texts are presented on the display in connection with these function keys. Thus, the user can either copy the selected data group on the clipboard by pressing the first function key 15a, or replace the selected data group with the data group stored on the clipboard by pressing the second function key 15b.

It was stated above that the first function key 15a is in this advantageous embodiment intended for either copying or cutting pieces of information. Both said functions can also be combined in the first function key 15a for example in the following manner. When the selection key 14 is pressed down, it indicates one function of the first function key 15a, such as copying. If, however, the user wishes to cut the selected data group, it is possible to change the operating mode of the first function key 15a for example in such a way that the first function key 15a is pressed down while the selection key is held down. Thus, the processor 4 changes the operating mode of the first function key into cutting. The cutting of the data group refers to the act of removing the selected data group from the document in connection with the transfer to the clipboard. From the clipboard the data group can be pasted to another part of the document, if desired.

In such a situation where a piece of information has not been selected in the document, but the clipboard contains information copied thereon at an earlier stage, the following steps are taken in this preferred embodiment of the invention. When the user presses the selection button 14 down, the second function key 15b is presented on the display 9, the function of this key is the pasting of information. The first function button 15b does not have to be presented in this context, because nothing has been selected.

Although the invention was presented above in connection with a terminal 1 that comprises a touch panel display, it is obvious that the invention can be applied in connection with other kinds of terminals as well. Thus, the first 15a and the second function button 15b can be implemented for example in such a manner that keys are arranged in the vicinity of the edge of the display 9, for example keys 17a and 17b in the terminal according to FIG. 1. Thus, when the selection key 14 is pressed down, a guiding text corresponding to the operating mode set in the keys 17a and 17b is presented in the vicinity of said keys on the display 9. Thus, the user can conduct the necessary actions by pressing these keys 17a and 17b in accordance with the above-presented principles.

Instead of said shift key of the keyboard, it is also possible to use another key as the above-presented selection key 14.

The functions according to the invention can be largely implemented in the application software of the processor 4.

It is obvious that the present invention is not limited solely to the above-presented embodiments, but it can be modified within the scope of the appended claims.

The invention claimed is:

1. An apparatus comprising:
   means for initiating selection of at least one piece of information of a data group by pressing a selection member down;
   means for setting a first function for a first function member after selection of the at least one piece of information of the selected data group, wherein the first function is copying which copies the selected data group to an auxiliary memory;
   means for displaying the first function for the first function member after selection of the at least one piece of information of the selected data group and when the selection member is pressed down, wherein the first function is selected by pressing the first function member down;

means for setting and displaying a second function different from the first function in the first function member when the selection member is held down, wherein the second function is cutting which copies the selected data group to the auxiliary memory and removes the selected data group from its original location, and wherein the second function is selected by pressing the first function member down while the selection member is held down;

means for setting a third function for a second function member when the auxiliary memory contains the selected data group, wherein the third function is pasting which pastes the selected data group from the auxiliary memory; and means for displaying the third function for the second function member when the auxiliary memory contains the selected data group and the means for selecting is held down.

2. The apparatus of claim 1, further comprising means for copying the selected data group between a processing memory to the auxiliary memory.

3. A method comprising:

initiating selection of at least one piece of information of a data group by pressing a selection member down;

setting a first function for a first function member after selection of the at least one piece of information of the selected data group, wherein the first function is copying which copies the selected data group to an auxiliary memory;

displaying the first function for the first function member after selection of the at least one piece of information of the selected data group and when the selection member is pressed down, wherein the first function is selected by pressing the first function member down;

setting and displaying a second function different from the first function in the first function member when the selection member is held down, wherein the second function is cutting which copies the selected data group to the auxiliary memory and removes the selected data group from its original location, and wherein the second function is selected by pressing the first function member down while the selection member is held down;

setting a third function for a second function member when the auxiliary memory contains the selected data group, wherein the third function is pasting which pastes the selected data group from the auxiliary memory; and displaying the third function for the second function member when the auxiliary memory contains the selected data group and when the selection member is held down.

4. The method according to claim 3, wherein the selected data group is copied from a processing memory to an auxiliary memory.

5. The method according to claim 3, further comprising:

selecting the at least one piece of information of the data group.

6. An apparatus comprising:

a selection member configured to initiate selection of at least one piece of information of a data group when the selection member is pressed down;

a processor configured to set a first function for a first function member after selection of the at least one piece of information of the selected data group, wherein the first function is copying which copies the selected data group to an auxiliary memory; and a function module configured to display the first function for the first function member after selection of the at least one piece of information of the selected data group and when the selection member is pressed down, wherein the first function is selected by pressing the first function member down wherein the processor is configured to set a second function different from the first function in the first function member when the selection member is held down, wherein the second function is cutting which copies the selected data group to the auxiliary memory and removes the selected data group from its original location, and wherein the second function is selected by pressing the first function member down while the selection member is held down;

wherein the processor is configured to set a third function for a second function member when the auxiliary memory contains the selected data group, wherein the third function is pasting which pastes the selected data group from the auxiliary memory; and wherein the function module is configured to display the third function for the second function member when the auxiliary memory contains the selected data group and the selection member is held down.

7. The apparatus according to claim 6, further comprising a copier configured to copy the selected data group between a processing memory to the auxiliary memory.

8. The apparatus according to claim 6, further comprising an activator configured to activate the first function member.

9. The apparatus according to claim 6, wherein the processor is configured for executing a word processing program, and wherein the selection member is configured for selecting the data group at a given time from the data processed by the word processing program.

10. The apparatus according to claim 9, wherein the function module and the selection member are arranged to be used at least when executing said word processing program.

11. A computer readable storage medium embedded with a computer program, comprising programming code for:

initiating selection of at least one piece of information of a data group by pressing a selection member down;

setting a first function for a first function member after selection of the at least one piece of information of the selected data group, wherein the first function is copying which copies the selected data group to an auxiliary memory;

displaying the first function for the first function member after selection of the at least one piece of information of the selected data group and when the selection member is pressed down, wherein the first function is selected by pressing the first function member down;

setting and displaying a second function different from the first function in the first function member when the selection member is held down, wherein the second function is cutting which copies the selected data group to the auxiliary memory and removes the selected data group from its original location, and wherein the second function is selected by pressing the first function member down while the selection member is held down;

setting a third function for a second function member when the auxiliary memory contains the selected data group, wherein the third function is pasting which pastes the selected data group from the auxiliary memory; and displaying the third function for the second function member when the auxiliary memory contains the selected data group and the selection member is held down.

* * * * *